United States Patent [19]
Kohout

[11] Patent Number: 6,103,139
[45] Date of Patent: Aug. 15, 2000

[54] SINGLE-USE ENCAPSULATED HOT PACK ACTIVATOR

[75] Inventor: Dan Kohout, Grayslake, Ill.

[73] Assignee: Allegiance Corporation, McGaw Park, Ill.

[21] Appl. No.: 09/130,562

[22] Filed: Aug. 8, 1998

[51] Int. Cl.[7] ................................ C09K 5/16; C09K 5/18
[52] U.S. Cl. ................................ 252/70; 23/296; 53/127; 126/263.03; 126/263.04; 165/10; 165/920
[58] Field of Search ...................... 252/70; 126/263.03, 126/263.04; 165/920, 10; 53/127; 23/296

[56] References Cited

U.S. PATENT DOCUMENTS

| | | | |
|---|---|---|---|
| 3,763,622 | 10/1973 | Stanley, Jr. | 53/25 |
| 3,892,060 | 7/1975 | Stanley, Jr. | 53/127 |
| 3,951,127 | 4/1976 | Watson et al. | 126/206 |
| 4,077,390 | 3/1978 | Stanley et al. | 126/263 |
| 4,231,885 | 11/1980 | Rueffel | 252/70 |
| 4,280,553 | 7/1981 | Bean et al. | 165/104.17 |
| 4,381,245 | 4/1983 | Wada et al. | 252/70 |
| 4,451,383 | 5/1984 | Arrhenius | 252/70 |
| 4,503,838 | 3/1985 | Arrhenius et al. | 126/263.03 |
| 4,572,158 | 2/1986 | Fiedler | 126/263 |
| 4,860,729 | 8/1989 | Benson et al. | 126/400 |
| 5,143,048 | 9/1992 | Cheney, III | 126/263.04 |
| 5,205,278 | 4/1993 | Wang | 126/263 |
| 5,305,733 | 4/1994 | Walters | 126/263 |
| 5,366,492 | 11/1994 | Ueki | 607/114 |
| 5,476,490 | 12/1995 | Silver | 607/108 |
| 5,827,915 | 10/1998 | Saita et al. | 524/394 |

OTHER PUBLICATIONS

Nucleation of Supersaturated Inorganic Salt Solutions, Industrial and Engineering Chemistry, vol. 44, No. 6, Maria Telkes, pp. 1308–1310 (No date).

Local Application of Therapeutic Heat and Cold, Virginia Commonwealth University/Medical College of Virginia School Nursing, Betsy A. Bampton, Ed.D., RNC., OGNP, pp. 1–7, (No date).

Chemical Abstracts No. 95:190058, abstract of an article entitled "Studies on low temperature . . . for thermal storage applications", Energy Convers. Manage. , 21(20) pp. 125–130 (1981), (No month).

Chemical Abstract No. 98:98954, abstract of an article entitled "Theory of melting . . . with surface coating", Phys. Rev. B:Condens. Matter, 27(3), pp. 1745–1761 (1983), (No month).

Chemical Abstract No. 110:31558, abstract of an article entitled "A mechanism . . . supercooled liquids", Mater. Chem. Phys. 20(2) pp. 171–178 (1988), (No month).

Chemical Abstract No. 129:56562, abstract of Japanese Patent Specification No. 10–147774 (Jun. 1998).

*Primary Examiner*—Anthony Green
*Attorney, Agent, or Firm*—Paul E. Schaafsma; Donald O. Nickey

[57] ABSTRACT

An activator (10) made in accordance with the principles of the present invention includes activating crystals (11) that have been formed into a shape and then coated with coating (12). The activator (10) of the present invention can be used in any environment in which the solidification of a supercooled solution occurs and whereby heat is generated during the solidification process. In the preferred embodiment disclosed herein, the activator is placed inside a hot pack (15) containing a supercooled solution (16). The hot pack can be made of a container made of a thermoplastic film which is formed into a bag, filled with activator (10) and the supercooled solution (16), and sealed to form the hot pack. The coating (12) of the activator (10) is impervious to the supercooled solution (16) in the hot pack (15) and into which the activator will be placed. The supercooled solution (16) may be any of a variety of chemical compositions known in the art which give off heat as they solidify.

32 Claims, 4 Drawing Sheets

FIG. 4
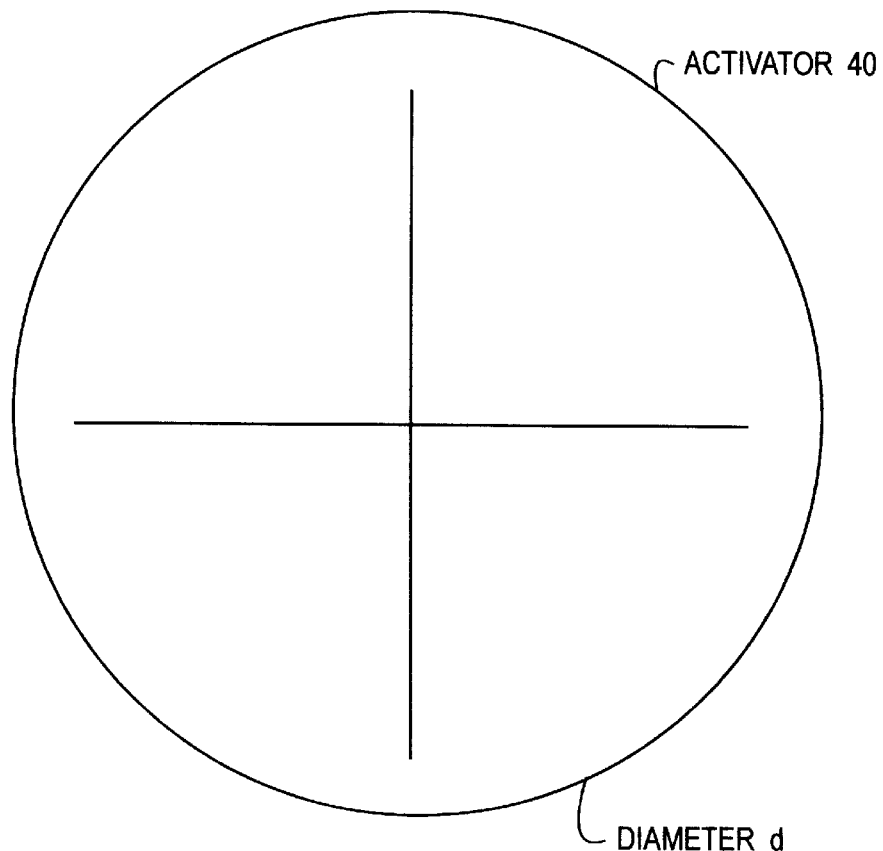
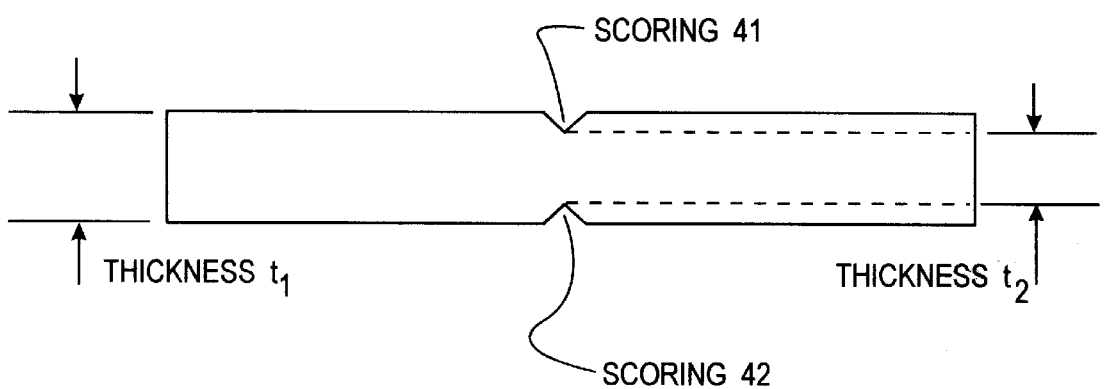

SINGLE-USE ENCAPSULATED HOT PACK ACTIVATOR

FIELD OF THE INVENTION

This invention relates to an activator for initiating solidification of a supercooled solution whereby heat is generated during the solidification process. More particularly, this invention relates to an activator made of activating crystals coated with a coating that is impervious to the supercooled solution. This invention also relates to hot packs containing such coated activators. Furthermore, this invention relates to a process for activating supercooled solutions using such coated activators.

BACKGROUND OF THE INVENTION

The use of supercooled solutions as the source of heat in hot packs is well known. Hot packs are used as infant heel warmers, for the treatment of soreness of muscles, as food warmers, and for other related applications. Certain salts once melted into a solution will remain liquid at a temperature below the melting point of the salt. On solidification, these supercooled solutions give up heat. Typically, water/salt combinations are used to make the supercooled solutions. Other ingredients may be added as well. Commercial solutions generally comprise sodium thiosulfate pentahydrate and dextrose in water, sodium acetate trihydrate in water, and eutectic combinations of sodium thiosulfate pentahydrate and sodium acetate trihydrate. These solutions give up heat when the salt contained therein solidifies or crystallizes.

In order to initiate heat dissemination, the supercooled solution must begin to solidify. Several techniques are known to initiate solidification. These include inserting a crystal of appropriate chemical formulation into the supercooled solution, generating particles within the solution, or generating a localized high energy source within the solution. This latter technique may be accomplished by frictionally generating localized heat within the solution. Inserting a crystal into a supercooled solution, or generating a particle therein, provides a nucleation site at which solidification of the supercooled solution initiates. Accordingly, the crystal or metal particle may be referred to as a nucleating crystal or nucleating particle, respectively. But each of these techniques includes drawbacks.

Inserting a crystal into the supercooled solution requires the use of a separate insertion device. In one form, this insertion device may be a syringe that injects a suspension of crystals into the supercooled solution. In another form, the insertion device may include an attached packet containing a puncture tool. In this latter form, a packet containing a suspension of crystals is intimately attached to the hot pack holding the supercooled solution. Inside this packet is a puncture tool that, when pressed, allows the suspension of crystals to enter the supercooled solution.

Yet another form of this technique places a nucleating crystal between two objects under sufficient pressure to prevent intrusion of the supercooled solution. When the pressure is released, the solution contacts the crystal and solidification is initiated. The syringe device has disadvantages because it is a separate device and the crystals in the suspension can plug the syringe rendering this method inoperative. The device comprising the puncture tool has disadvantages because the packet may be accidentally pressed, such as in packaging or shipping. rendering the hot pack inoperative for its intended purpose. The method using pressure to entrap the crystal is inherently inflexible.

One technique uses metal particles generated from within a supercooled solution by flexing a slotted metal strip contained therein. The metal strip is treated so that rust particles form on its surface. By flexing the metal strip the rust particles may be released into the solution and present a nucleation site. A disadvantage to this technique is the inconsistency of operation. Dependent on the surface preparation, either particles may prematurely initiate nucleation or initiation may not take place. If the surface is too roughened with rust particles nucleation may happen with very little disturbance of that surface resulting in premature nucleation. If the extent of rust formation is too limited, it may be difficult to generate the nucleating particles.

A number of techniques have been developed to generate localized energy sources for the initiation of solidification. Generally, a strip, typically made of metal, and defining holes or slits, is placed into the hot pack containing a supercooled solution. The strip may be pre-formed into a concave-like shape so that when it is depressed and released it springs back to its original shape. Activation occurs with bending or depressing the strip. Drawbacks to this approach include loss of activation ability should the strips break and puncture of the solution container by the broken strips. It has been reported that for some of these devices activation is inconsistent. Another method of generating a localized energy source comprises rubbing together hard objects to generate high localized energy and thus steric hindrance. These hard objects are typically in fluid contact with the supercooled solution. Potentially the hard objects could be rubbed together if the hot pack is mishandled resulting in premature nucleation.

Each of the above methods of initiating nucleation has to some extent proven unreliable or cumbersome. Unreliability of the initiating mechanism diminishes the usefulness of the associated hot pack. What would therefore be advantageous would be to initiate nucleation without the use of a separate insertion device. It would be further advantageous to avoid the inconsistencies of operation of the prior art devices.

SUMMARY OF THE INVENTION

The present invention provides an activator for initiating solidification of a supercooled solution whereby heat is generated during the solidification process. The present invention initiates nucleation of the supercooled solution without the use of a separate insertion device. The present invention further avoids the inconsistencies of operation of the prior art devices.

The present invention provides an activator which includes crystals pressed into a formed shape and then coated with a coating that is impervious to the supercooled solution. The present invention provides an activator which includes crystals contained within a protective coating. The present invention provides a method for making such activators. The present invention further provides a process useful for activating a supercooled solution by breaking a formed shape of crystals, coated with a coating that is impervious to the supercooled solution, thus exposing activating crystals to the solution. The present invention also provides an improved hot pack comprising a supercooled solution and an activator, wherein the activator comprises a formed shape made from activating crystals and coated with a coating that is impervious to the supercooled solution.

BRIEF DESCRIPTION OF THE DRAWINGS

FIG. 4 is an isometric view of an activator made in accordance with one embodiment of this invention.

DETAILED DESCRIPTION OF THE INVENTION

Figure 1:
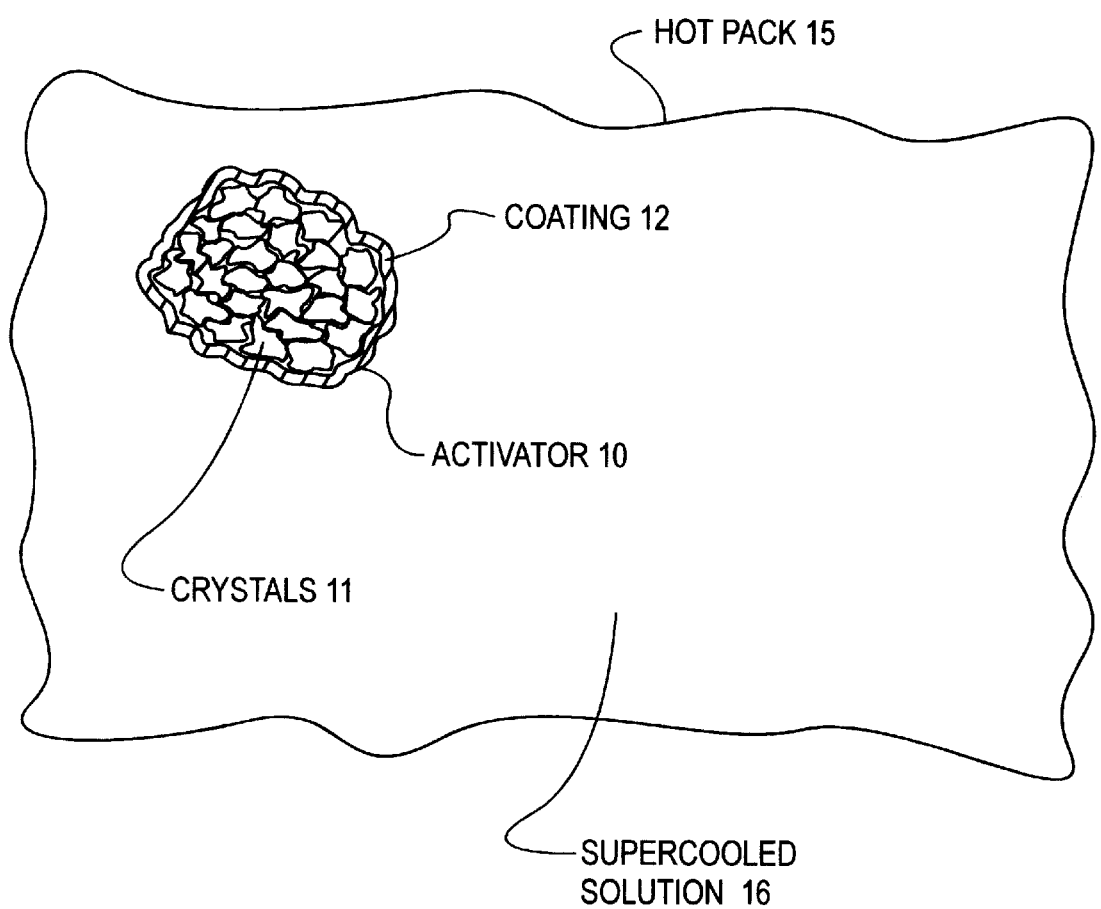
FIG. 1 is a cross-sectional view of an activator made in accordance with the principles of the present invention placed inside of a hot pack containing a supercooled solution.

Referring to FIG. 1, an activator made in accordance with the principles of the present invention is designated by (10). The activator includes activating crystals (11) that have been formed into a shape and then coated with coating (12). The activator (10) of the present invention can be used in any environment in which the solidification of the supercooled solution occurs and whereby heat is generated during the solidification process. In the preferred embodiment disclosed herein, the activator is placed inside a hot pack (15) containing a supercooled solution (16). The hot pack can be made of a container made of a thermoplastic film which is formed into a bag, filled with activator (10) and the supercooled solution (16), and sealed to form the hot pack.

The coating (12) of the activator (10) is impervious to the supercooled solution (16) in the hot pack (15) and into which the activator will be placed. The supercooled solution (16) may be any of a variety of chemical compositions known in the art which give off heat as they crystallize. The crystals (11) include pure crystals or mixtures of crystals which are known to initiate solidification of the solution (16). The coating (12) is selected so as to be imperious to the supercooled solution (16) but also factorable so that when the activator (10) is broken, crystals (11) may enter the supercooled solution (16) through the fracture in the coating (10).

The supercooled solution (16) may include, for example, sodium thiosulfate pentahydrate and dextrose in water, sodium acetate trihydrate in water, and eutectic combinations of sodium thiosulfate pentahydrate and sodium acetate trihydrate. However, other solutions may also be used so long as they give up heat on solidification. The term solidification as used here describes the change of the supercooled solution (16) from its liquid phase to its solid phase. Solidification may also be referred to as resolidification or crystallization, and all of these terms are considered equivalents of one another. The supercooled solution (16), while generally referred to as a supercooled solution, may also be referred to as a supersaturated solution. Furthermore, when water is present, the supercooled solution (16) may also be referred to as a supercooled aqueous solution or a supersaturated aqueous solution.

The crystals (11) are selected from those crystals known to initiate solidification of the supercooled solution (16). Crystals of the same composition as the crystals forming the supercooled solution are known to initiate solidification when exposed to the supercooled solution. For example, crystals of sodium thiosulfate pentahydrate will initiate solidification in a supercooled solution of sodium thiosulfate pentahydrate in water. Other ingredients, such as dextrose, may be present in the water so long as they do not prevent solidification. It is also known that crystals having all unit cell dimensions within about 15% of all the unit cell dimensions of the crystal which makes up the supercooled solution will initiate solidification of the supercooled solution. Stated another way, a crystal having its longest or shortest unit cell dimension within 15% of the shortest or longest unit cell dimension, respectively, of the crystal comprising the supercooled solution will initiate solidification of the supercooled solution. This relationship is referred to as the "15% rule." The 15% rule is further described in, Maria Telkes, Nucleation of Supersaturated Salt Solutions, I&EC Res., vol. 44, no. 6, American Chemical Society (June 1952). The unit cell dimension is determined from examination of crystallographic data.

The crystals (11) used to make the formed shape of the activator (10) may in fact be mixtures of crystals. The mixture is capable of initiating solidification of the supercooled solution (16). Generally speaking, mixtures of crystals wherein each crystal satisfies the 15% rule will meet this requirement. It is preferred that at least about 95% of the crystals (11) used to make the formed shape are of one chemical formula. Accordingly, up to about 5% of the crystals (11) may be of a different chemical formula.

Mixtures of crystals, wherein at least about 95% of the crystals are of one chemical formula, can be formulated to have a higher melting point than the 95% fraction alone. If the activator (10) is placed into the hot pack (15) prior to melting the crystal to form the supercooled solution (16), it may be necessary to raise the melting point of the activator so it does not melt during this solutioning process. The additive may initiate recrystallization of the supercooled solution if there is enough heat present to partially liquefy the activator. This is especially true if the activator crystal is chemically the same as the crystal used to form the supercooled solution because there is a singular melting point. By diluting the activator crystals of one chemical formula with up to about 5% of crystals of a different chemical formula, so long as the 15% rule is satisfied, melting of the activator during the solutioning process may be avoided.

The shape of the crystals may be any shape so long as the activator can be fractured by manipulation. The shape of the crystals are referred to as the "formed shape." The specific geometry of the formed shape is not critical. Generally the formed shape may be selected from the group consisting of cylinders, ovoids, spheres, parallelepipeds, pyramids, cones, polyhedra and combinations thereof. It may be a pill (ovoid) or a tablet (cylinder). However, irregular shapes are also contemplated. It is also contemplated that the coating may ultimately determine the formed shape of the crystals. In this case a loose assemblage of crystals may be inserted into a coating that has been pre-formed into a configuration that may contain such an assemblage. In all of these cases, regardless of the actual shape the crystals take on, the assemblage of crystals is referred to as a formed shape.

Preferably the formed shape will fracture when manipulated by hand. Fracturing under single-handed manipulation is most preferred; however, fracturing the formed shape by manipulation using mechanical means is also contemplated. The means useable for fracturing the formed shape is only limited by the strength and durability of the hot pack (15). The mechanical means must not be so severe as to damage the hot pack (15) resulting in leakage of the supercooled solution (16).

The formed shape may be made by any of the methods suitable for making pellets such as medicinal tablets. The equipment required is well known in the art and can generally be referred to as a pellet press. Typically, the crystals (11) that will make up a formed shape will be placed into a mold or a die in the pellet press that defines the shape. Then mechanical means are used to press the crystals with sufficient force to density the crystals allowing them to retain their formed shape throughout the remainder of the process of manufacturing the activator. Laboratory scale pellet presses may be purchased from Aldrich Chemical, Milwaukee, Wis. Commercial scale pellet presses may be purchased from Scheu & Kniss, Louisville, Ky. Generally, any method capable of pressing or forming the crystal into a shape that possesses sufficient strength to allow handling will be suitable.

The formed shape may also be a loose assemblage of crystals. In this case, the formed shape is in a fractured state. The formed shape is contained by a coating that allows handling of the formed shape.

Figure 2:
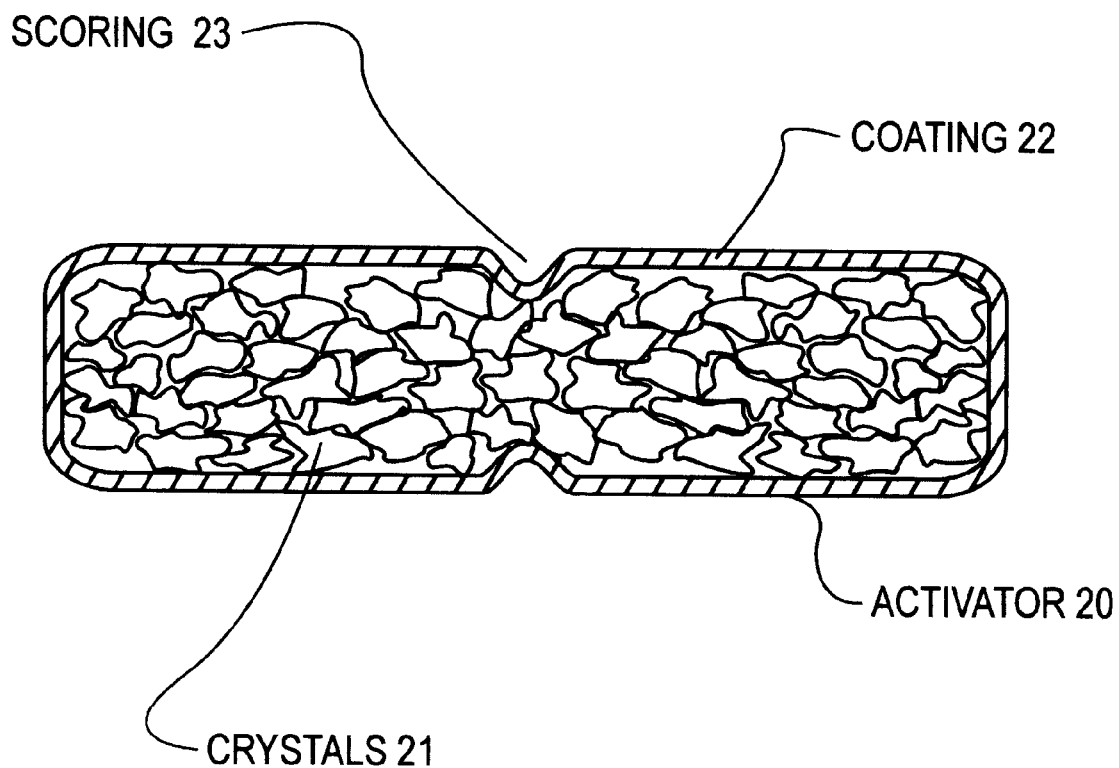
FIG. 2 is a cross-sectional view of an activator made in accordance with one embodiment of this invention.

To aid fracturing by manipulation, the formed shape may be scored. Referring to FIG. 2, an activator made in accordance with the principles of the present invention is designated by the reference numeral (20). The activator includes activating crystals (21) that have been pressed to make a formed shape. Scoring (23) is made in the formed shape. The scoring (23) comprises indentations that are made in the formed shape so as to produce a cross-sectional dimension or thickness that is less than the cross-sectional dimension or thickness in the absence of scoring. Scoring may be accomplished by including provision for the scoring in the mold used to make the formed shape. It may be added after the formed shape is produced by using a tool that can scribe or cut the scoring into the formed shape. Other methods for scoring the formed shape will be apparent to those skilled in the art. The formed shape, including the scoring, is then coated with a coating (22) which is impervious to the supercooled solution into which the activator (20) will be placed.

Figure 3:
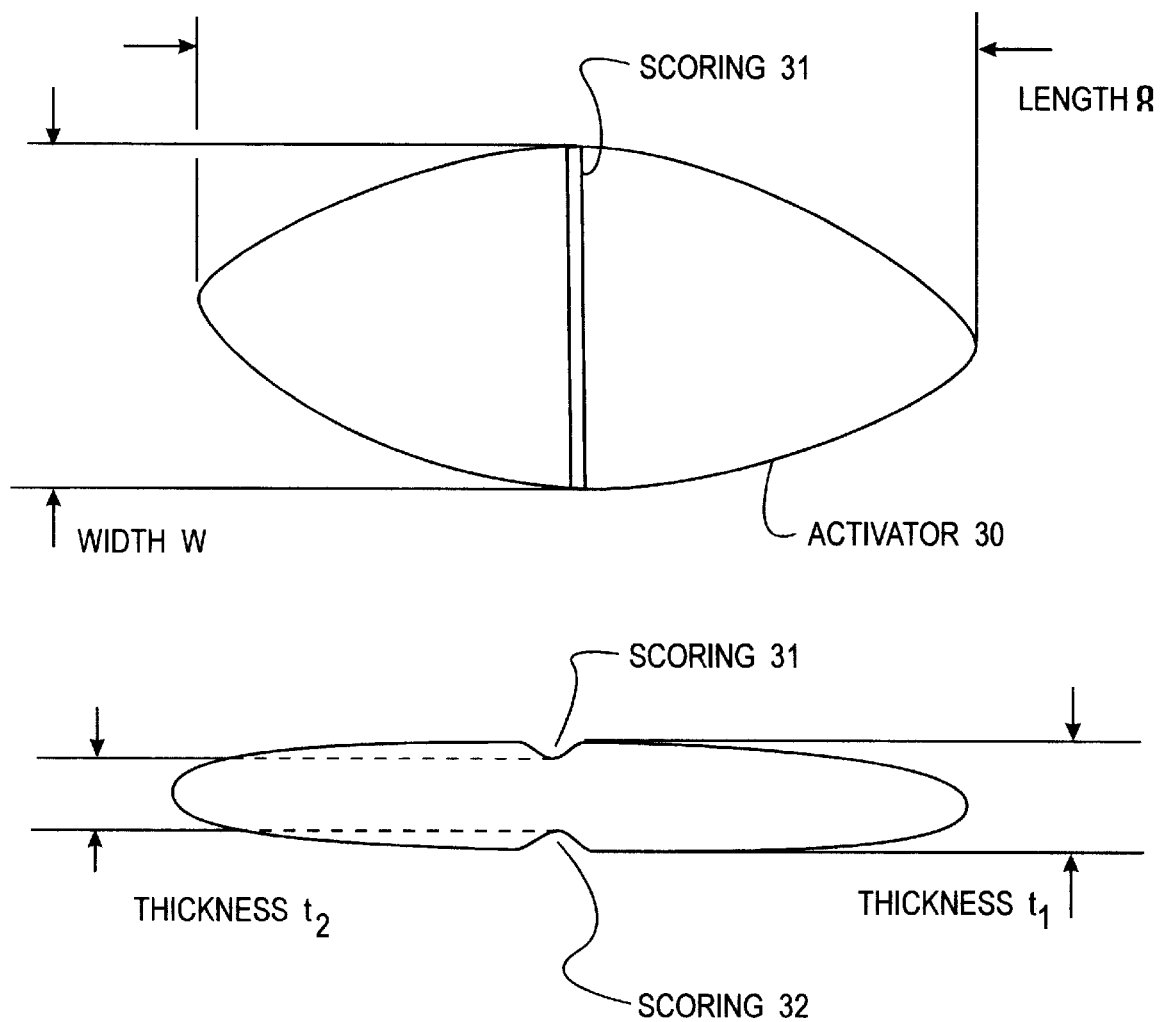
FIG. 3 is an isometric view of an activator made in accordance with one embodiment of this invention.

Referring now to FIG. 3, an isometric view of an activator (30) in the shape of a tablet (ovoid) is shown. The tablet dimensions are generally described by the width (w), length (l) and thickness ($t_1$). Another dimension shown is the scored thickness ($t_2$) which describes the distance between the scoring (31, 32). The scoring is made so that the scored thickness ($t_2$) is less than the tabled thickness ($t_1$). With scoring, the fracturing of the formed shape by manipulation is greatly facilitated.

FIG. 4 shows yet another embodiment of an activator made in accordance with this invention. The activator (40) is in the shape of a wafer (cylinder). The wafer dimensions are generally described by the diameter (d) and the thickness ($t_1$). The scored thickness is shown ($t_2$) which describes the distance between the scoring (41, 43). Here too, the scoring is made so that scored thickness ($t_2$) is less than the wafer thickness ($t_1$). Although the scoring may be made to any practical dimension, preferably the scored thickness ($t_2$) will range from a thickness of about the thickness if the wafer minus 1/32 inch ($t_1 - 1/32$ inch), to about one-half the value of the thickness of the wafer ($t^1/2$).

The formed shape may be of any appropriate size. The size may vary, for example, with the size of the hot pack or the intended use of the hot pack. The size may be larger to accommodate easier manipulation if needed. Referring back to FIG. 3, for an activator in the shape of a tablet (ovoid), the length (l) may range from about 0.5 inch to about 2 inches, the width (w) from about 0.25 inch to about 0.75 inch, and the thickness ($t_1$) from about 0.05 inch to about 0.75 inch. Referring to FIG. 4, for an activator in the shape of a wafer (cylinder), the diameter (d) may range from about 0.5 inch to about 2.0 inches, and the thickness ($t_1$) from about 0.05 inch to about 0.5 inch.

The coating (15), is selected so that it is impervious to the super cooled solution and it is fracturable with manipulation. The manipulation contemplated is the same as that considered for the fracturability of the formed shape. Representative coatings include, for example, red PLASTIC-DIP available from PDI, Inc., Circle Pines, Minn. and poly (methyl methacrylate-co-ethyl acrylate) and poly(methyl methacrylate-co-vinyl acetate), both available from Aldrich Chemical Co., Milwaukee, Wis. PLASTI-DIP is an air dry synthetic rubber coating having 24 percent solids. Upon drying, PLASTI-DIP exhibits a durometer of about 70 Shore A and an ASTM D-638 tensile strength of about 2,500 psi. Generally, coatings selected from the group including thermoplastic polymers, thermosetting polymers, waxes, and combinations of these may be used as the coating (15). Examples of thermoplastic polymers include polyethylene, polypropylene, polyurethane, polystyrene, polycarbonate, polymethacrylate, polyester, and polyamide. Examples of thermosetting polymers include phenolic resins, such as novolacs and resoles, furan resins, and urea-formaldehyde resins. Examples of waxes include paraffin waxes, bees waxes, branched-chain hydrocarbons, and, generally, mixtures of esters of higher fatty acids, higher fatty alcohols, free higher acids, free higher alcohols, and saturated hydrocarbons.

The coating may be applied as a solution wherein the solvent is allowed to evaporate leaving the solute coating deposited on the formed shape. Representative solvents include, for example, 2-propanol, acetone, methyl ethyl ketone, tetrahydrofuran, and toluene, all available from Aldrich Chemical Co., Milwaukee, Wis. Generally, any organic solvent capable of dissolving the coating may be used. These solvents may further include alcohols, ethers, esters, ketones, toluenes and combinations of these solvents. Examples of alcohols include, in addition to 2-propanol, methanol, ethanol, propyl alcohol, butyl alcohol, sec-butyl alcohol, and pentanol. Examples of ethers include dimethyl ether, diethyl ether, dibutyl ether, butyl ethyl ether, and ethoxy ethyl ether. Examples of esters include methyl acetate, ethyl acetate, butyl acetate, and diethyl carbonate. The coating once applied should preferably dry to a nearly tack free state, although it is not necessary that it be in fact tack free.

The coating may be applied as a sheet that is formed and sealed around the formed shape. The sheet may be made from any of the coating materials disclosed herein, or any equivalents of these coating materials. One or more sheets may be placed over the formed shape and the sheets then formed to conform to the formed shape and sealed together to encapsulate the formed shape. It should be understood that where the step of coating includes applying the coating as a sheet that is sealed around the formed crystal shape, more than one sheet may be used. One such means to apply a coating is vacuum forming. However, other means of encapsulating a formed shape using a coating applied as a sheet are also suitable.

The coating is preferably applied as a sleeve. A preformed sleeve may be made from any of the coating materials disclosed herein, or any equivalents of these coating materials. The sleeve is manufactured so that it has an interior void separated from an exterior by a sleeve wall. The shape of the sleeve wall generally conforms to the formed shape. One means to manufacture the sleeve is by an injection molding process. However, other means capable of forming such sleeves are also suitable. The sleeve may be manufactured to have two open ends. The sleeve may also be manufactured to have just one open end. In either case, the formed shape may be placed into the interior void of the sleeve. Two sleeves may be used so that each sleeve covers about one-half of the formed shape. The coating encapsulates the formed shape when the open end or ends of the sleeve or sleeves are sealed. An end of a sleeve may be sealed by melting the end together or by using an adhesive to achieve a similar effect. Where two sleeves are used, two adjacent open ends of each sleeve may be sealed to each other by melting the ends together or using an adhesive to achieve a similar effect. It should be understood that where the step of coating includes applying the coating as a sleeve that is sealed around the formed crystal shape, more than one sleeve may be used.

A process for making the activator of this invention comprises the steps of selecting the crystals or mixture of crystals that will initiate solidification of the supercooled solution of interest. These crystals, or mixture of crystals, are also selected so that preferably they do not melt during the solutioning process. The crystals or mixture of crystals are then pressed to make the formed shape. If scoring is desired, then the formed shape is optionally scored. This may be accomplished most practically when the formed shape is pressed by including provisions for the scoring in the mold or die used to make the formed shape. However, scoring may also be added after the formed shape is made. Next, the coating is applied to the formed shape. The coating is selected so that it is impervious to the supercooled solution into which it will be placed, and so that it does not interfere with the fracturability of the activator. Application of the coating may be accomplished by applying the coating as a melt, as a solution, as sheet that is sealed around the formed shape, or as a sleeve that is subsequently sealed to encapsulate the formed shape.

Another process for making the activator of this invention comprises the steps of selecting the crystals or mixture of crystals that will initiate solidification of the supercooled solution of interest. These crystals, or mixture of crystals, are also selected so that preferably they do not melt during the solutioning process. The crystals or mixture of crystals are then inserted as a loose assemblage into a coating that is pre-formed into a configuration that may contain such an assemblage. An example of a coating pre-formed into such a configuration is a coating that is a pre-formed sleeve. The coating is selected so that it is impervious to the supercooled solution into which it will be placed, and so that it does not interfere with the fracturability of the activator.

The activator made in accordance with the principles of the present invention is useful for inclusion in nonreusable hot packs that give up heat when a supercooled solution contained within solidifies. The activator may used with any hot pack of this type. The activator may be placed into such a hot pack in generally any method used to manufacture these hot packs.

Example 1

In a preferred embodiment, an activator was produced in the laboratory for use in initiating solidification of a supercooled solution of sodium thiosulfate pentahydrate. A crystal mixture containing nominally about 99% sodium thiosulfate pentahydrate and nominally about 1% of sodium tetraborate decahydrate (borax) was prepared. A formed shape, having a generally parallelepiped shape, was then pressed from the crystal mixture using a laboratory pellet press. The formed shape had nominal dimensions of 2 inches by 1 inch by 0.25 inch. The formed shape was very hard to the touch and could be handled without reducing the shape to all individual crystals. The formed shape then was coated over its entire surface using Red Plasti-Dip. The activator thus formed was placed in a pouch containing a supercooled solution comprising water and sodium thiosulfate at 180° F. This temperature is the packaging temperature of hot packs made using sodium thiosulfate pentahydrate as the operative component of the supercooled solution. The pouch was then allowed to cool by immersing the pouch in ice-water. The activator was stored in the pouch, at room temperature, for one week. At the end of the one week period, the activator was broken by hand manipulating it as it resided in the pouch, and solidification of the supercooled solution was thus initiated.

Example 2

In one embodiment, an activator was produced in the laboratory for use in initiating solidification of a supercooled solution of sodium thiosulfate pentahydrate. A crystal mixture containing nominally about 99% sodium thiosulfate pentahydrate and nominally about 1% of sodium tetraborate decahydrate (borax) was prepared. A formed shape, having a generally parallelepiped shape, was then pressed from the crystal mixture using a laboratory pellet press. The formed shape had nominal dimensions of 2 inches by 1 inch by 0.25 inch. The formed shape was very hard to the touch and could be handled without reducing the shape to all individual crystals. The formed shape then was coated over its entire surface with a wax that was a mixture of esters of higher fatty acids, higher fatty alcohols, free higher acids, free higher alcohols, and saturated hydrocarbons. The activator thus formed was placed in a pouch containing a supercooled solution comprising water and sodium thiosulfate at 180° F. This temperature is the packaging temperature of hot packs made using sodium thiosulfate pentahydrate as the operative component of the supercooled solution. The pouch was then allowed to cool by immersing the pouch in ice-water. The activator was stored in the pouch, at room temperature, for one week. At the end of the one week period, the activator was broken by hand manipulating it as it resided in the pouch, and solidification of the supercooled solution was thus initiated.

There has been provided, in accordance with the present invention, a hot pack activator, a method for producing a hot pack activator, and a hot pack employing the activator of this invention. While the invention has been described with specific embodiments, many alternatives, modifications and variations will be apparent to those skilled in the art in light of the foregoing description. Accordingly, it is intended to include all such alternatives, modifications and variations set forth within the spirit and scope of the appended claims.

I claim:

1. An activator for initiating solidification of a supercooled salt solution, the activator comprising:
a shaped solid comprising a plurality of salt crystals, the shaped solid being fracturable by hand to produce at least two pieces; and a coating completely covering the shaped solid, the coating being impervious to a supercooled salt solution in which the activator may be placed and fracturing upon fracturing the shaped solid, the coating being selected from the group consisting of: synthetic rubber and wax.

2. The activator of claim 1, wherein the shaped solid is scored.

3. The activator of claim 1, wherein the shaped solid has a shape selected from the group consisting of cylinder, ovoid, sphere, parallelepiped, pyramid, cone, and polyhedron.

4. The activator of claim 1, wherein the coating is poly(methyl methacrylate-co-ethyl acrylate), poly(methyl methacrylate-co-vinyl acetate), or a mixture of poly(methyl methacrylate-co-ethyl acrylate) and poly(methyl methacrylate-co-vinyl acetate).

5. The activator of claim 1, wherein the coating is a synthetic rubber.

6. The activator of claim 1, wherein the coating is a wax selected from the group consisting of paraffin wax, bees wax, branched-chain hydrocarbons, a mixture of esters of higher fatty acids, higher fatty alcohols, free higher acids, free higher alcohols and saturated hydrocarbons, and mixtures of any of the foregoing.

7. The activator of claim 1, wherein the plurality of salt crystals include a salt crystal selected from the group consisting of sodium thiosulfate pentahydrate, sodium tetaborate decahydrate, sodium acetate trihydrate, a eutectic combination of sodium thiosulfate pentahydrate and sodium acetate trihydrate, and mixtures of any of the foregoing.

8. The activator of claim 1, wherein the plurality of salt crystals comprises a mixture of salt crystals having at last two different chemical formulas.

9. The activator of claim 1, wherein the plurality of salt crystals includes at least one salt crystal having a chemical formula which is the same as a salt used to make a supercooled salt solution to be solidified using the activator.

10. The activator of claim 1, wherein the plurality of salt crystals includes at least one salt crystal having a unit cell dimension which is within about 15% of a unit cell dimension for a salt crystal used to make a supercooled salt solution to be solidified using the activator.

11. The activator of claim 1, wherein the plurality of salt crystals comprise from about 95% to about 100% of a first salt and from about 5% to about 0% of a second salt.

12. An activator for initiating solidification of a supercooled salt solution, the activator comprising:

a shaped solid comprising from about 95 percent to about 99 percent by weight, based on a total weight of salt crystals, of sodium thiosulfate pentahydrate and from about 1 percent to about 5 percent by weight, based on the total weight of the salt crystals, of sodium tetraborate decahydrate, the shaped solid being fracturable by hand to produce at least two pieces; and a coating completely covering tie shaped solid, the coating being impervious to a supercooled salt solution in which the activator may be placed and fracturing upon fracturing the shaped solid, the coating being selected from the group consisting of: synthetic rubber and wax.

13. The activator of claim 12 wherein a sum of the percent of the sodium thiosulfate pentahydrate and the percent of the sodium tetraborate decahydrate is 100 percent.

14. The activator of claim 12 wherein the shaped solid is an ovoid.

15. The activator of claim 14 wherein the width of the ovoid is from about 0.25 inch to about 0.75 inch, the length is from about 0.5 inch to about 2.0 inches, and the thickness is from about 0.05 inch to about 0.5 inch.

16. The activator of claim 12 wherein the shaped solid is a cylinder.

17. The activator of claim 16 wherein the cylinder is from about 0.5 inch to about 2.0 inches in diameter and from about 0.05 inch to about 0.5 inch in thickness.

18. The activator of claim 12 wherein the shaped solid is scored to facilitate fracturing the shaped solid into two or more pieces.

19. The activator of claim 12 wherein the coating is poly(methyl methacrylate-co-ethyl acrylate), poly(methyl methacrylate-co-vinyl acetate), or a mixture of poly(methyl methacrylate-co-ethyl acrylate) and poly(methyl methacrylate-co-vinyl acetate).

20. The activator of claim 12 wherein the coating is a synthetic rubber.

21. The activator of claim 12 wherein the coating is a wax selected from the group consisting of paraffin wax, bees wax, branched-chain hydrocarbons, a mixture of esters of higher fatty acids, higher fatty alcohols free higher acids, free higher alcohols, and saturated hydrocarbons, and mixtures of any of the foregoing.

22. The activator of claim 12 wherein the plurality of salt crystals further includes sodium acetate trihydrate, a eutectic combination of sodium thiosulfate pentahydrate and sodium acetate trihydrate, or both.

23. A process for making an activator for initiating solidification of a supercooled salt solution, the process comprising the steps of:

forming a shaped solid comprising a plurality of salt crystals selected from the group consisting of sodium thiosulfate pentahydrate, sodium acetate trihydrate, and a eutectic combination of sodium thiosulfate pentahydrate and sodium acetate trihydrate by pressing to provide a shaped solid fracturable by hand to produce at least two pieces; and coating the solid completely with a synthetic rubber coating or a wax coating that is impervious to a supercooled salt solution to which the activator is added, the coating fracturing upon fracturing of the shaped solid.

24. The process of claim 23 wherein in the coating step, a coating solution comprising a coating solute and a solvent is applied onto the shaped solid.

25. The process of claim 24 wherein the coating step further includes the step of allowing the solvent to evaporate.

26. The process of claim 23 wherein the coating step includes the step of applying the coating as a sheet and sealing the sheet around the shaped solid.

27. The process of claim 23 wherein the coating step includes the step of applying the coating as a sleeve and sealing the sleeve around the shaped solid.

28. The process of claim 23 further comprising the step of scoring the shaped solid to facilitate featuring the shaped solid into two or more pieces.

29. The process of claim 23 wherein in the forming step the salt crystals are pressed into a shaped solid having a shape selected form the group consisting of cylinder, ovoid, sphere, parallelepiped, pyramid, cone, and polyhedron.

30. The process of claim 23 wherein the coating is poly(methyl methacrylate-co-ethyl acrylate), poly(methyl methacrylate-co-vinyl acetate), or a mixture of poly(methyl methacrylate-co-ethyl acrylate) and poly(methyl methacrylate-co-vinyl acetate).

31. The process of claim 23 wherein the coating is a synthetic rubber.

32. The process of claim 23 wherein the coating is a wax selected from the group consisting of paraffin wax, bees wax, branched-chain hydrocarbons, a mixture of esters of higher fatty acids, higher fatty alcohols, free higher acids, free higher alcohols, and saturated hydrocarbons, and mixtures of any of the foregoing.

* * * * *